Figure 1:
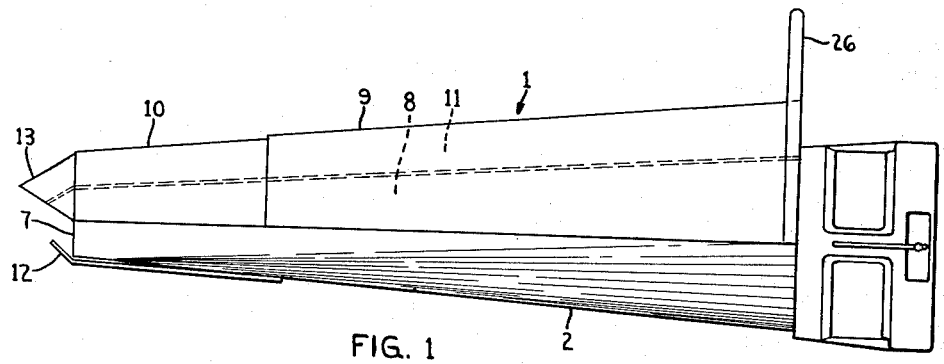

April 20, 1965

H. S. LENHART 3,179,472

PNEUMATIC CONVEYING APPARATUS

Filed Sept. 6, 1961

2 Sheets-Sheet 1

INVENTOR.
HERBERT S. LENHART

BY Perrine Edmunds Morton
Barrows & Taylor
attys

April 20, 1965   H. S. LENHART   3,179,472
PNEUMATIC CONVEYING APPARATUS
Filed Sept. 6, 1961   2 Sheets-Sheet 2

INVENTOR.
HERBERT S. LENHART 3,179,472
PNEUMATIC CONVEYING APPARATUS
Herbert S. Lenhart, Allentown, Pa., assignor to Fuller
Company, a corporation of Delaware
Filed Sept. 6, 1961, Ser. No. 136,326
4 Claims. (Cl. 302—58)

This invention relates to apparatus used in the conveying of granular or pulverulent material by pneumatic means. More specifically the invention pertains to an improved nozzle used in a vacuum system for transporting cement, flour, or similar materials from one destination to another.

Generally the vacuum system comprises a conveying line having a flexible conduit preferably with a vacuum-producing means communicating with its discharge end. A nozzle having first and second substantially parallel, open-ended passages is secured on the opposite or intake end of the conduit with the first, or air-material passage forming a continuation of the conveying line.

The ends of the nozzle passages opening into the free end of the nozzle are related to each other so that when the free end of the nozzle is embedded in the granular or pulverulent material, and suction is applied through the conveying line to the air-material passage, air from the atmosphere will enter and flow through the second, or air intake passage and into the first, or air-material passage. It is to be understood, that the term "air" is used throughout the specification and claims as representing any gas suitable for the purposes of conveying material in suspension in a conduit.

Air passing from the second, or air intake passage entrains the adjacent granular material and carries it into and through the first, or air-material passage and the conveying line to the designated point of discharge. The granular material is separated from the air stream prior to reaching the vacuum-producing means by separating means well known in the art, for example, cyclone separators.

The nozzles utilized in the prior art have had the disadvantage of having the air-material passage easily blocked off with the resulting decrease in conveying capacity or stoppage of the system. In addition, the position of the terminal portion of the partition or common wall separating the two passages at the free end of prior nozzles was critical and it was necessary for the operator in the field to vary the position of this common wall with respect to the other nozzle surfaces by trial and error until the proper relationship was obtained. If the two passageways are related so that insufficient air is supplied to the suction pipe, then too large a quantity of granular material will enter the suction tube, whereupon the vacuum-producing means will stall and the line will be plugged. If the passageways are related so that too much air enters the suction tube, the air-to-material ratio will become excessive, consequently reducing the conveying efficiency.

In the prior art, the relationship between the two passageways was varied by altering the position of the terminal portion of the partition or common wall separating the two passages at the free end of the nozzle. It was found that no single position was suitable for all of the materials handled. Hence it was necessary for the operator in the field to vary the length of the partition by trial and error until a satisfactory relationship was obtained for the conveying of that particular material. However, such positioning of the partition generally was not suitable for another granular material and hence each nozzle was limited in use unless, or until the operator modified it so that it could be used for another material. Moreover, even with a given material, varying particle sizes and moisture contents greatly influenced the efficiency with which a given nozzle would convey the material.

The improved nozzle of the instant invention can be used for a variety of types of material as well as with varying particle sizes and moisture contents with equal facility and without the necessity of varying the relationship of the two passageways.

The present invention enables better mixing of the material and air at the mixing portion or free end of the nozzle, which results in increased capacity.

The present device eliminates the necessity for altering or cutting partitions in the field by the operator, and is self-compensating for a variety of sizes and types of granular material.

The present invention incorporates a nozzle in which there is better air distribution throughout the width of the air-material passage, which passage is not susceptible to being readily blocked-off.

The present invention incorporates an interrupted, preferably saw-toothed or serrated edge on the partition separating the nozzle air intake and air-material passages.

Figure 2:
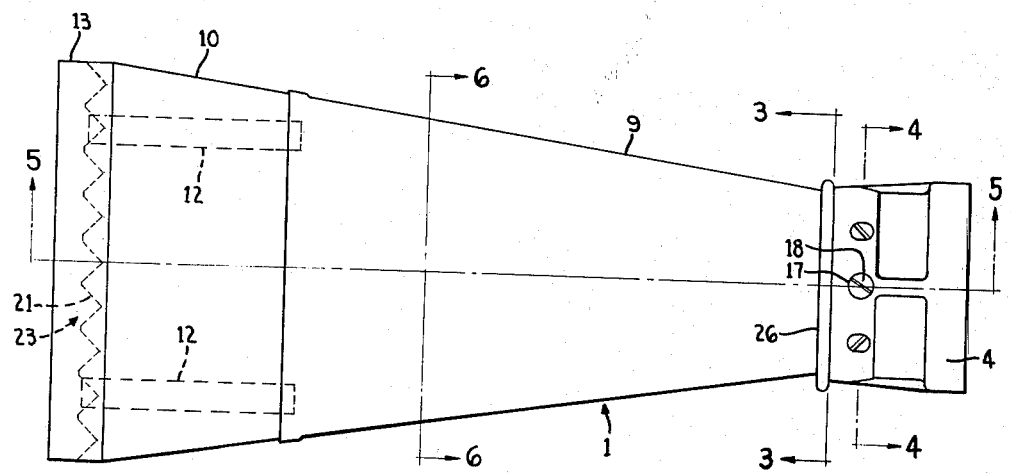
Figure 3:
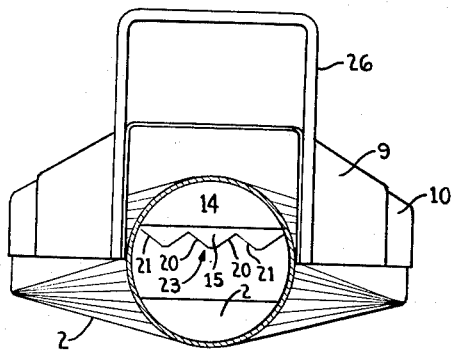
Figure 4:
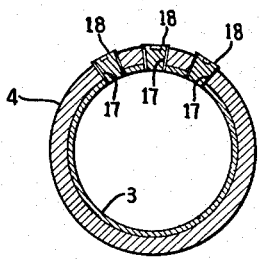
Figure 5:
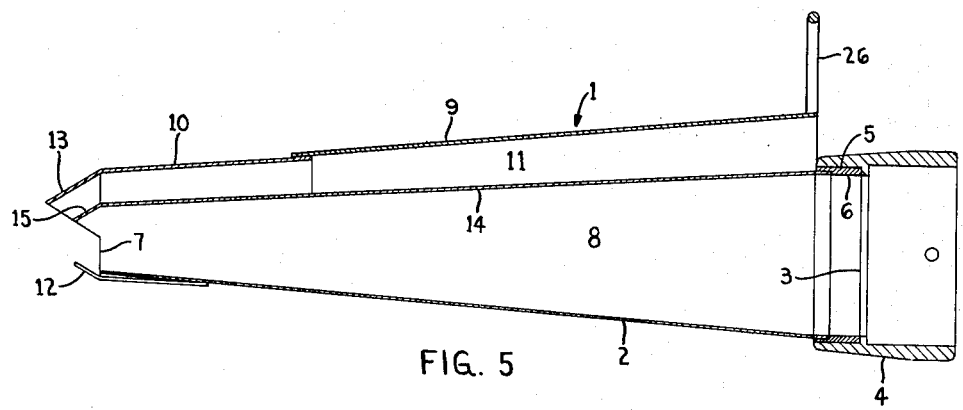
Figure 6:
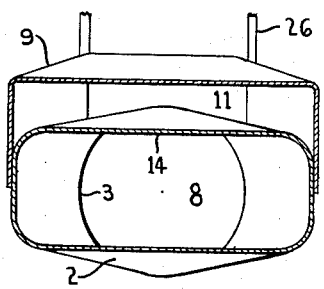
Figure 7:
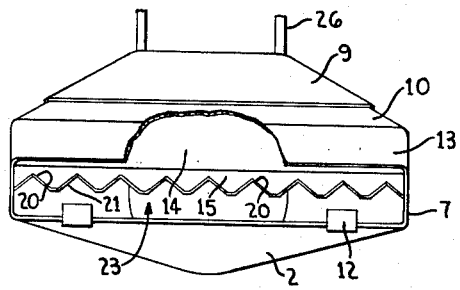

A preferred embodiment of the invention is described in conjunction with the drawings, wherein:

FIG. 1 is a side view of the improved nozzle;
FIG. 2 is a plan view of the improved nozzle illustrating the fanned shape and improved partition edge;
FIG. 3 is a sectional view on lines 3—3 of FIG. 2 looking through the two nozzle passages;
FIG. 4 is a sectional view in lines 4—4 of FIG. 2 illustrating the tuning ports;
FIG. 5 is a sectional view on lines 5—5 of FIG. 2 taken through the nozzle axis;
FIG. 6 is a sectional view on lines 6—6 of FIG. 2, and
FIG. 7 is an end view of the nozzle with a portion of the channel removed to show the air inlet passage.

A fan-shaped form of the new nozzle 1 is illustrated in the drawings and comprises a fan-shaped duct 2 providing a conveying or air-material passage 8 for the flow of air-entrained pulverulent or granular material, such as cement, for example. The duct 2 has a circular outlet-end portion 3 connected to a coupling member 4 and a generally rectangular-shaped material-inlet end 7 at its opposite end. Ski-shaped members 12 welded or otherwise secured to the bottom of duct 2 serve to support and protect the inlet end of the nozzle during operation.

Successive, overlapping channel-shaped members 9, 10 and 13 overlying and welded to duct 2 form an air intake passage 11 generally parallel to duct 2. The air passage 11 may be formed by a single channel, or by any desired number of channels. The upper surface of channel 13 is fairly steeply inclined toward the bottom wall of duct 2 so that air flowing through the air intake passage 11 will be deflected and guided downwardly adjacent the open or intake end 7 of duct 2.

A wall 14 of duct 2 is common to both passages 8 and 11 throughout their respective lengths. The end portion 15 of wall 14 adjacent the free end of the nozzle is inclined substantially parallel with the sloping surface of channel member 13 and has a plurality of projections extending longitudinally therefrom which are preferably formed by a series of V-shaped notches 20 having sloping edges 21 and forming a serrated or saw-toothed partition edge indicated generally by numeral 23. The interrupted edge 23 may be formed with curvate, rectangular or any desired shape of projection. However, the notched form disclosed is considered particularly advantageous.

The circular outlet end portion 3 of duct 2 fits within a bore 5 of a coupling member 4 and is secured thereto by shrink fitting or other suitable means such as a cementing joint 6. Coupling 4 has three tuning ports 17 adapted to receive plastic pipe plugs 18 to inactivate them as will be subsequently explained. A handle 26 is attached to the air inlet end of channel 9 and is used to move the nozzle during operation.

In operation the coupling member 4 is attached to a conduit, preferably a flexible hosing (not shown), which communicates via a conveying line with a storage bin or other destination where the pulverulent material is to be carried. A vacuum is set up in the conveying line by a blower or other well known means. The nozzle 1 is applied to a supply of granular material to be carried to the bin by immersing the free end of the nozzle in the material.

Atmospheric air enters the duct 9 adjacent handle 26 and flows through the passage 11, across the serrated edge 23 and back through the passage 8, coupling 4, and the attached hosing. As the air leaves the passage 11, it mixes with and entrains the granular material and carries the entrained material through passage 8 and the attached hosing to the storage bins or other destination.

With a given vacuum load, the capacity of the nozzle is largely dependent on the effective mixing of the air and the material adjacent the material inlet end 7 of nozzle 1. With the partition 14 separating passages 11 and 8 being sloped and having a serrated edge 23 at the entrance end of the nozzle as shown, the agitation or turbulence of the air flow therearound provides for efficient mixing of air and material beyond that of a nozzle having a partition with a straight edge perpendicular to the nozzle axis.

With prior nozzles having a straight-edged partition between the nozzle passages, there would be one large stream of air emitting from the air intake passage. It was found that the positioning of the partition edge was critically different for each of various types and sizes of granular material. Hence it was necessary for the operator to experiment with a nozzle by initially having the partition extending outwardly at an extreme position, and continually shortening the partition by repositioning, if it was adjustable, or by cutting portions away, until a satisfactory relationship was reached for the particular type and size material being conveyed. Even the moisture content could change the optimum partition position.

After the optimum position of these straight-edge partitions are obtained, there is considerably less effective mixing of air and material than with an interrupted or a serrated-edge partition. Moreover, should a portion of the nozzle inlet be shoved against a bin wall, or should the nozzle be blocked by other means, such as for example a large lump or glob of material partially obstructing the nozzle inlet, only a small area of the nozzle portion corresponding to the present air-material passage 8 would be effective in carrying material.

On the other hand, with the improved nozzle, instead of a single large stream of air flowing between passages 11 and 8, there are, in effect, a number of individual streams of air which result in efficient, turbulent mixing, and a consequently increased conveying capacity. The blending of the several streams into a single conveying stream, within the air-material passage 8, creates a highly turbulent mixing zone extending beyond the serrated edge 23 into the air-material passage 8.

Moreover, since the cross-sectional area of the air-material passage adjacent inlet end 7 is varied due to the serrated, sloping configuration of end portion 15, the velocity of the air passing therethrough varies across the width of the nozzle at the inlet end 7. In addition, the axially sloping edges 21 of the serrated partition edge 23 cause the mixing to take place over a larger axial distance than occurs with a straight edge partition, the extent depending upon the size of the notches and the slope of the end portion 15. In addition to accomplishing better mixing of air and material, which results in increased and more efficient capacity, the positioning of the partition edge is no longer critical in the improved nozzle.

The improved nozzle construction also results in better air distribution across the width of the nozzle. Were a portion of the free end of the nozzle to come in contact with a bin wall or other obstruction, that portion of the nozzle would not be entirely blocked off. There still would be air flow through the individual notches and some minimum of mixing across the entire nozzle.

Hence the nozzle construction of the instant invention results in increased conveying capacity, and enables the use of a single nozzle for a variety of types and sizes of granular material without alteration of the nozzle surfaces in the field. The operator need no longer cut, reform, or adjust the partition to a workable position suitable to a particular material.

Moreover, with the partition edge-location no longer being critical the improved nozzle is easier to operate. So long as the inlet to air passage 11 is unobstructed, the distance the free end of the nozzle is embedded in the granular material is of little consequence in conveying the material.

In actual use it is customary for the operator to push the free end of the nozzle far into the pile of granular material near the base of the pile. As the material is conveyed through the system, the material yet to be conveyed, seeking its natural angle of repose, keeps the inlet portion of the nozzle covered for a considerable period of time and the operator need not continually move or carry the nozzle during operation.

Even though the improved nozzle can be used for a variety of materials, there are times when it is desirable to vary the air- to material-ratio, particularly in services in which the overall conveying distance is variable, such as occurs when the system feeds material to a plurality of storage bins at separate locations in a plant. For this purpose, the circumferentially spaced tuning ports 17 in coupling 4 are used. During operation, atmospheric air is short-circuited therethrough to the coupling and the conveying line, consequently bypassing the nozzle passages 11 to 8 to increase the air to material ratio of the stream within the conveying line. The purpose of these ports is two-fold. They provide carrier air for the material already inside the nozzle, and secondly, they reduce the vacuum effect in the nozzle and hence reduce the rate of solids pick-up.

The illustrated nozzle has three tuning ports and any or all of them can be used depending on the desired air-material ratio. The inactive ports are closed by the plastic pipe plugs 18.

Various changes may be made in the details of the invention without sacrificing the advantages thereof or departing from the scope of the claims.

I claim:

1. An improved nozzle comprising a rectangular and gradually tapering conduit for gas-entrained material, a rectangular and gradually tapering gas supply channel positioned immediately above said conduit, said conduit and said channel being of substantially the same horizontal width throughout their common length, a common wall for both the conduit and gas channel, a gas-material outlet at one end of said conduit adapted to be subjected to a vacuum pressure, an end portion of said common wall angling downwardly towards the material inlet of the conduit and terminating immediately adjacent the gas-material inlet, a gas-material outlet at the opposite end of said conduit, said channel having one end of its outer wall angling downwardly with the angled end portion of the common wall terminating immediately adjacent said material inlet, the other end of said channel being open to the atmosphere, the angled portion of the common wall having a plurality of notches, said notches being uniformly distributed along the edge of the common wall adjacent the material inlet and comprising a plurality of gas flow passages across the horizontal width of the gas-material inlet.

2. An improved nozzle as set forth in claim 1, wherein said nozzles comprise a series of V-shaped notches.

3. An improved nozzle as set forth in claim 2, wherein the conduit and gas channel form a fan-shaped nozzle and have substantially flat surfaces adjacent the material inlet to form passages having rectangularly shaped cross sections.

4. An improved nozzle as set forth in claim 3, wherein the angled end portion of the channel and common wall are inclined substantially parallel to one another.

References Cited by the Examiner

UNITED STATES PATENTS

| | | | |
|---|---|---|---|
| Re. 23,035 | 8/48 | Stock | 302—58 |
| 289,315 | 11/83 | Smith | 302—58 |
| 594,449 | 11/97 | Weber | 302—58 |
| 2,210,030 | 8/40 | Ellis | 15—420 |
| 2,528,278 | 10/50 | Kendrick | 15—420 |

FOREIGN PATENTS

| | | |
|---|---|---|
| 27,674 | 1908 | Great Britain. |
| 276,114 | 10/13 | Germany. |

SAMUEL F. COLEMAN, Acting Primary Examiner.

ANDRES H. NIELSEN, Examiner.